United States Patent
Klaus et al.

[11] 3,877,844
[45] Apr. 15, 1975

[54] PUMP

[76] Inventors: Franz Klaus, Uhlandstr. 54, 463 Bochum; Hans E. Fichtner, Langen Donk 127, 415 Krefeld 1, both of Germany

[22] Filed: Nov. 5, 1973

[21] Appl. No.: 413,173

[30] Foreign Application Priority Data
Nov. 6, 1972 Germany............................ 2254265

[52] U.S. Cl.................................... 417/420; 308/70
[51] Int. Cl. ... F04b 17/00; F04b 35/04; F16c 25/00
[58] Field of Search .......... 417/420, 423; 308/9, 70, 308/66

[56] References Cited
UNITED STATES PATENTS

| | | | |
|---|---|---|---|
| 1,712,310 | 5/1929 | Sayre | 308/70 |
| 2,366,562 | 1/1945 | Schug | 417/420 |
| 2,373,609 | 4/1945 | Stahl | 417/420 |
| 2,711,934 | 6/1955 | Rickenmann | 308/9 |
| 2,822,223 | 2/1958 | Offen | 308/DIG. 1 |
| 2,970,548 | 2/1961 | Berner | 417/420 |
| 3,195,466 | 7/1965 | Young | 308/70 |
| 3,520,642 | 7/1970 | Fulton | 417/420 |

*Primary Examiner*—William L. Freeh
*Assistant Examiner*—Richard E. Gluck
*Attorney, Agent, or Firm*—Hill, Gross, Simpson, Van Santen, Steadman, Chiara & Simpson

[57] ABSTRACT

A centrifugal pump, particularly useful in the chemical industry for pumping corrosive and toxic fluids, has all parts which are exposed to the fluids being pumped completely isolated from the pump driving mechanism without the use of wearable seals such as packings, stuffing boxes and the like and the driving mechanism is coupled to the pump mechanism by magnets. An outer housing rotatably supports a cup-shaped magnet carrying outer rotor and an inner housing carried by the outer housing rotatably supports an inner rotor telescoped inside of the outer cup-shaped rotor and coupled to a centrifugal pump impeller in a pump casing mounted on an end of the housing. The inner rotor is supported on spring-loaded corrosion resisting conical bearings wich automatically take up wear.

8 Claims, 2 Drawing Figures

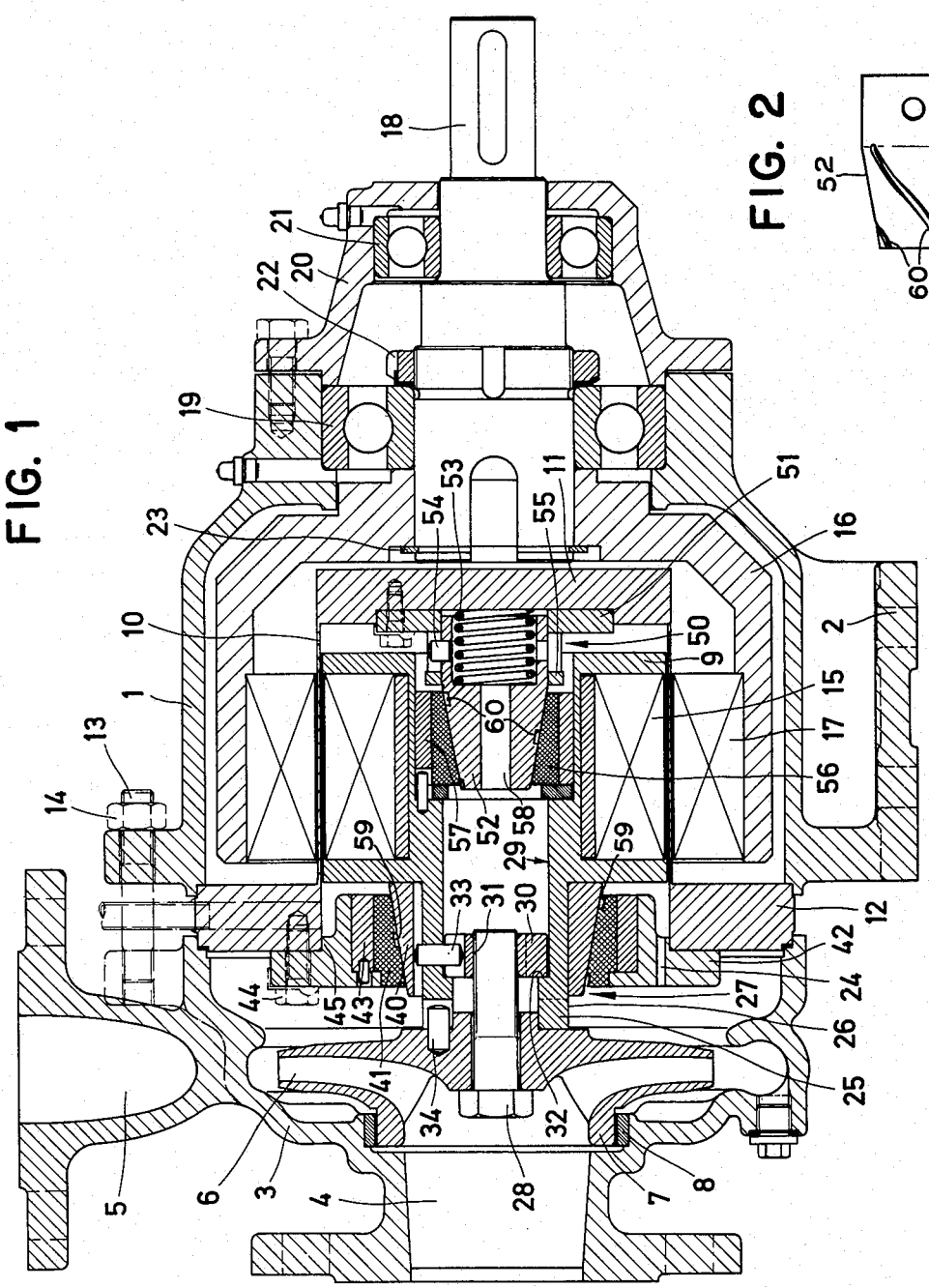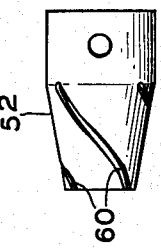

PUMP

BACKGROUND OF THE INVENTION

This invention relates to the art of isolating driving and driven components of a pump and the use of magnets to couple the isolated components. Specifically, the invention deals with a centrifugal pump especially suitable for the chemical industry in handling corrosive and toxic liquids and avoiding the heretofore required wearable seals such as packings ans stuffing boxes by coupling isolated driven and driving parts through a magnetic field.

Heretofore centrifugal pumps suitable for handling corrosive and toxic liquids in the chemical industry required seals such as packings and stuffing boxes between the driving and driven components. These seals introduced friction, did not wear well, deteriorated rapidly in a toxic atmosphere and the pumps therefor required constant supervision. In those pumps where the bearings were exposed to the liquid being pumped, cylindrical bushings or journal boxes were constructed with material resistant to the liquids being pumped, the pump temperature and the pump speed. These bearings, however, had to be accurately mounted and were quite expensive.

The present invention now eliminates the necessity for the heretofore required seals, packings and stuffing boxes and the expensive bearings.

According to this invention a cup-shaped housing rotatably supports a shaft carrying a cup-shaped rotor surrounded by the housing. This rotor supports either an electrically induced field or a permanent magnet induced field. An inner cup-shaped housing is telescoped in the cup-shaped rotor and has an outturned flange plate seated in the mouth of the cup-shaped housing. This inner housing rotatably supports an inner magnet carrying rotor, the magnetic field of which is closely surrounded by the magnetic field of the outer rotor. A pump casing overlies the flange of the inner housing and is secured to the main outer housing. The pump casing has an axial inlet and a peripheral outlet with a volute chamber therebetween receiving a shrouded impeller that is keyed to the inner rotor. The bearings for the impeller carrying inner rotor include a spring loaded auxiliary conical bearing carried by an end wall of the inner housing surrounded by a conical bearing seat in the inner rotor together with a main conical bearing surrounding a hub of the inner rotor and riding in a bearing seat carried by an end plate secured on the inner housing. The main bearing is self-centering and the auxiliary bearing provides an automatic wear take-up to maintain the inner and outer conical components of both bearings in proper bearing relationship. The conical bearings or their seats, or both, can be grooved to receive fluid being pumped providing a liquid film between the bearings and their seats to reduce friction and wear and to flush out dirt.

It is then an object of this invention to provide a driven pump with completely isolated driving and driven components coupled for co-rotation through a magnetic field.

A further object of the invention is to provide a hermetically sealed centrifugal pump sub-assembly surrounded by an unsealed driving assembly all encased in a common housing and having an electrically induced or permanent magnet induced magnetic field coupling the driving assembly with the hermetically sealed components to drive the pump impeller.

A still further object of this invention is to provide a centrifugal pump especially suitable for handling corrosive and toxic liquids in the chemical industry which is free from rotating seals and has a magnetic field coupling a driver with a hermetically sealed pump shaft to drive the pump.

Another object of the invention is to provide a centrifugal pump with a cup-shaped main housing having bearings in the closed end thereof rotatably supporting a shaft carrying a cup-shaped outer rotor which surrounds an impeller driving inner rotor with the impeller mounted in a pump casing secured to the open end of the main casing and with permanent magnets coupling the inner and outer rotors for co-rotation.

Another object of this invention is to provide a centrifugal pump having a pump shaft supported on a main conical bearing gryoscopically centering the shaft at high speeds.

Another object of this invention is to provide a hermetically sealed pump and bearing assembly with a self-centering main conical bearing and a spring loaded auxiliary conical bearing effective to take up wear of both bearings.

Other and further objects of this invention will become apparent to those skilled in this art from the following detailed description of the annexed sheet of drawings in which:

IN THE DRAWINGS

FIG. 1 is a cross sectional view of a preferred embodiment of the pump of this invention; and FIG. 2 is a plan view of the conical bearing of the pump of this invention.

AS SHOWN IN THE DRAWINGS

A main cup-shaped casing 1 having a mounting foot 2 has a pump housing 3 mounted over the mouth thereof. The pump housing 3 has a central axial inlet 4 and a peripheral outlet 5 with an annular volute chamber therebetween receiving a shrouded centrifugal pump impeller 6 having a hub 7 riding in a stationary ring 8 carried by the casing 3.

An inner rotor 9 is mounted in an inner cup-shaped can or housing 10 with a relatively thick bottom or end wall 11 and a relatively thick outturned flange disc 12 with the cylindrical wall of the can between the thick end 11 and flange 12 being quite thin as shown.

Mounting screws 13 extending through outturned lugs on the casing parts 1 and 3 receive nuts 14 to clamp the flange disc 12 between the open mouth of the cup-shaped main housing 1 and the open rear end of the pump casing 3.

The inner rotor 9 has permanent magnets 15 fitted on its outer circumference and a cup-shaped outer rotor 16 in the housing 1 surrounds the housing 10 and has permanent magnets 17 fitted around its inner circumference in closely spaced opposition to the magnets 15 with the inner and outer magnets, of course, being isolated by the interposed thin cylindrical wall of the inner cup-shaped housing or can 10. The outer rotor is carried by a drive shaft 18 supported on ball bearings 19 in the cylindrical boss end of the main housing 1. A cap 20 is bolted over this boss end of the housing and carries ball bearings 21 supporting a reduced diameter portion of the shaft 18. The bearing 19 has its inner race fixed to the shaft 18 by a shaft nut 20.

The cup-shaped rotor 16 has a hub keyed to the shaft 18 and a snap ring 23 in a groove on the shaft 18 is bottomed against the hub to cooperate with the shaft nut 22 for holding the shaft against axial displacement.

The interior of the inner housing or can 10 is vented to the pump casing by holes or bores 24.

The inner rotor 9 has a hollow shaft or hub portion 25 with a cylindrical bearing surface supported by a main conical bearing assembly 27. This hollow hub or shaft 25 carries the pump impeller 6 through a mounting screw 28 extending through the hub of the impeller into the hollow interior bore 29 of the hub 25. A disc 30 has internal threads receiving the end of the bolt 28 and when the bolt is tightened in the disc 30, the disc is bottomed against a shoulder 32 in the bore 29 of the hub 25, thereby clamping the hub of the impeller on the end of the hub 25. A radial pin 33 projects through the hub 25 into a transverse slot or groove of the disc 30 to hold the disc against rotation in the bore 29 and an axial pin 34 projects from a hole in the hub of the impeller 6 into a slot in the end of the hub 25 to key the impeller to the hub 25.

The main bearing 27 includes a hollow cone 40 surrounding the hub 25 and keyed against rotation by the pin 33 seated in an internal groove of the cone. The cone is bottomed on the rotor and is surrounded by a conical bearing seat 41 which is carried by an end plate 42 that carries a cylindrical bushing 43 and in turn, is bolted to the flange 12 by screws 44. The plate 42 is centered in the aperture of the end flange disc 12 by a shoulder 45 and a pin holds the bushing 43 against rotation in the plate 42.

The main bearing 27 composed of the truncated conical rotating bearing 40 and the surrounding truncated conical fixed bearing 41 is sufficient to carry the inner rotor 9 since rotation of the rotor will automatically center the cone 40 in its seat 41. However, an auxiliary bearing assembly 50 is also provided to cooperate with the main bearing 27 and to also provide a wear take-up for both bearings. This rear bearing 50 is supported from a disc 51 seated in a recess of the thick end wall 11 of the housing and secured therein by screws. A bearing cone 52 has a hollow cylindrical rear end receiving a coil spring 53 and a pin 54 projects from this cylindrical portion of the cone into a slot of a collar 55 on the disc 51. The cone 52 is surrounded by a conical seat 56 which in turn is supported in the inner bore 29 of the rotor 9 by a bushing 57 which bushing is held against rotation in the rotor by means of a pin. The inner conical bearing 52 has a bore 58 therethrough.

The conical bearing 52 is thus held against rotation but is axially spring loaded to seat in the surrounding conical bearing 56 which rotates with the rotor. The spring 53 in urging the cone 52 into its surrounding conical seat 56 in turn urges the rotor 9 to the left thereby urging the conical member 40 of the main bearing into the main bearing seat 41. This eliminates axial end play of the rotor 9 in the housing 10 and also takes up wear of the conical bearing surfaces.

Since bores such as 24 through the bearing plate 42 freely join the pump chamber with the interior of the housing 10 and since the grooves receiving the pins 34 and 31 join the pump casing with the inner bore 29 of the rotor hub or shaft 25 and since the bore 58 of the cone 52 joins the bore 29 with the open rear end of the bore, the two bearings 27 and 50 are flooded with the fluid being pumped. The greatest diameter of the bearing cone 52 has the same diameter as the bore 29 of the rotor hub or shaft 25 and since it is backed by fluid in the rear of the casing 10 an axial hydraulic equalization of thrust is provided and the force with which the bearing cones 40 and 52 are pressed into their surrounding bearing boxes 41 and 56 is controlled by the helical spring 53. The conical constructions of the two bearings 27 and 50 with the automatic positioning of the bearing components by the helical spring 53 provides an automatic adjustment without supervision.

Several spiral grooves 59 are provided in the bearing seat 41 and similar grooves 60 are provided in the bearing 52. These grooves receive the pump liquid and are preferably arranged so that in combination they surround the entire periphery of the bearing. When three spiral grooves are used, one groove surrounds about 120° of the bearing circumference. The spiral grooves are open only at one end to receive the pumped liquid and the other ends are blind. Further, the spiral grooves are tapered in the direction of the extending cone and increase in depth and/or in width. The pumped liquid entering the grooves acts in the manner of surfboards, aqua-planing of the shiftable conical bearing of each pair. Tests have surprisingly shown that the bearing cones 40 and 52 will ride out of contact in their conical bearing boxes 41 and 56 with an intervening film of pump liquid. The grooves could also be placed on the bearing members 40 and 56 and also serve to flush out dirt. Tests showed that when both bearing parts were made of stainless steel which was not heat treated or annealed neither of the cooperating bearing parts adhered to each other or were corroded. The bearing in being pressed together by the spring 53 and by riding on the pumped liquid have substantially greater wear life than heretofore used cylindrical bearings.

From the above descriptions it will therefore be understood that the invention provides a pump in which the driving components are hermetically sealed from the driven components and coupled for co-rotation therewith by an electrically induced magnetic field preferably in the form of permanent magnets. The pump impeller is supported on a main concial bearing which is self-centering and backed up by a spring loaded auxiliary bearing, both of which can be aquaplaned on the fluid being pumped to preserve the bearing surfaces.

We claim as our invention:

1. A pump which comprises a cup-shaped main housing, a shaft rotatably supported in the closed end of said main housing, a cup-shaped rotor in said main housing having the closed end thereof adjacent the closed end of the main housing and secured to said shaft for co-rotation, a cup-shaped inner housing projecting through the open end of said cup-shaped rotor into closely spaced relation with the closed end of said rotor and having an outturned flange around the open end thereof secured to the open end of said main housing, an inner rotor projecting through the open end of said inner cup-shaped housing into closely spaced relation with the closed end of said inner housing, a pump casing overlying the open end of said inner housing and secured to the open end of said main housing, said pump casing having an axial inlet and a circumferential outlet, a pump impeller in said pump casing having an inlet registering with the casing inlet and an outlet discharging to the casing circumferential outlet, means fixedly mounting said pump impeller on said inner rotor, a main conical bearing surrounding a portion of said inner rotor and supported by said inner housing in the open end thereof rotatably supporting said inner rotor in said inner housing, an auxiliary spring loaded conical bearing carried by the closed end of said inner housing and projecting into said inner rotor to cooperate with the main conical bearing to support the inner rotor, said inner housing hermetically sealing pump fluid from said main housing, said inner housing and said main and auxiliary bearings receiving fluid from said pump casing, and magnets carried by the inner periphery of the shaft mounted rotor and the outer periphery of the inner rotor providing a magnetic field coupling the rotors for co-rotation whereby rotation of the shaft will drive the pump impeller.

2. A pump and drive assembly adapted for pumping corrosive and toxic liquids without leakage or damage to the drive which comprises a cup-shaped main housing, a drive shaft rotatably mounted in the closed end of said main housing, a cup-shaped rotor having the closed end thereof mounted on said shaft adjacent the closed end of the main housing and an open end adjacent the open end of the main housing, a cup-shaped inner housing projecting into the cup-shaped rotor with its closed end adjacent the closed end of the rotor and an outturned flange around its open end bottomed on the open end of the main housing, an inner rotor projecting into the open end of said inner housing into close spaced relation with the closed end of the inner housing, said inner rotor having a hub portion projecting beyond the open end of the inner housing, a bearing carried by the outturned flange of said inner housing surrounding said hub and rotatably mounting the inner rotor in the inner housing, a centrifugal pump casing bottomed on the outer flange of said inner housing and secured to said main housing, an impeller in said pump casing mounted on the hub of said inner rotor adjacent said bearing, permanent magnet means secured to the inner periphery of the cup-shaped rotor supported by said shaft, cooperating permanent magnet means secured to the periphery of said inner rotor in alignment with the first mentioned magnet means and means venting the interior of the pump casing to the bearing and the interior of the inner housing to flow fluid through the bearing and inner housing.

3. A centrifugal impeller pump suitable for pumping corrosive and toxic fluids and a drive for said pump protected from said fluids which comprises a main housing, an outer rotor in said main housing, a shaft supported by the main housing for driving said outer rotor, a cup-shaped inner housing projecting into said main housing and surrounded by said outer rotor, an inner rotor having a hollow core projecting into said inner housing, a pump casing overlying said inner housing, means uniting the pump casing to the main housing and clamping the inner housing therebetween, a first self-centering conical bearing carried by said inner housing surrounding and supporting the hollow core of said inner rotor, a second self-centering conical bearing carried by the inner housing projecting into said hollow core of the inner rotor and cooperating with the first bearing to rotatably mount the inner rotor in the inner housing, spring means acting on said second bearing to take up wear on both bearings, a pump impeller in said pump casing keyed on the hollow core of said inner rotor, said first and second bearings having bearing surfaces communicating with the interior of the pump casing to receive fluid therefrom, a first permanent magnet means secured to the inner periphery of said outer rotor around said inner housing, a second permanent magnet means secured to the periphery of said inner rotor around said hollow core thereof and aligned with said first magnet means, and said first and second magnet means being nested in closely spaced relation separated only by said inner housing whereby rotation of the shaft will drive the impeller through a magnetic field between the first and second magnet means, the bearings supporting the inner rotor will be lubricated by fluid from the pump casing and the drive for the outer rotor will be isolated from the pump fluid.

4. The pump of claim 1 wherein the inner rotor is hollow and has a projecting hub portion at one end, the main conical bearing surrounds the hub portion, and the auxiliary conical bearing projects into the hollow interior at the other end of the inner rotor.

5. The pump of claim 2 wherein the inner rotor has a bore therethrough, radial flanges extending therefrom receiving magnetic means therebetween and an auxiliary bearing carried by the inner housing projects into said bore in supporting relation therewith.

6. The pump of claim 2 including a spring loaded auxiliary conical bearing for the inner rotor taking up wear of the main bearing.

7. The pump of claim 2 wherein the bearing has conical bearing surfaces decreasingly tapering toward the closed end of the inner housing, a second bearing projects into the inner rotor from the closed end of the inner housing and has conical bearing surfaces decreasingly tapering toward the open end of the inner housing, and spring means act on the second beearing to urge the bearing surfaces of both bearings into bearing contact for rotatably supporting the inner rotor from the inner housing.

8. The pump of claim 3 wherein the bearing surfaces are grooved to distribute the pump fluid therethrough.

* * * * *